(12) United States Patent
Serino et al.

(10) Patent No.: US 6,538,546 B2
(45) Date of Patent: Mar. 25, 2003

(54) MAGNETIC CORE FOR A NON-CONTACT DISPLACEMENT SENSOR

(75) Inventors: Yoichi Serino, Aichi Pref. (JP); Masayuki Yamamoto, Saitama Pref. (JP); Masaki Sugiyama, Aichi Pref. (JP); Hideaki Tsuchiya, Aichi Pref. (JP); Masakazu Moriyama, Aichi Pref. (JP); Shunsuke Nakaura, Nara Pref. (JP); Norio Nakatani, Mie Pref. (JP); Takahiro Sanada, Nara Pref. (JP); Hidenobu Nagano, Nara Pref. (JP)

(73) Assignees: Tokyo Sintered Metal Company Limited, Tokyo (JP); Koyo Seiko Co., Ltd., Osaka (JP)

( * ) Notice: Subject to any disclaimer, the term of this patent is extended or adjusted under 35 U.S.C. 154(b) by 67 days.

(21) Appl. No.: 09/893,410

(22) Filed: Jun. 29, 2001

(65) Prior Publication Data

US 2002/0021199 A1 Feb. 21, 2002

(30) Foreign Application Priority Data

Jun. 30, 2000 (JP) ........................................ 2000-197661

(51) Int. Cl.$^7$ ................................................ H01F 27/02
(52) U.S. Cl. ............................. 336/96; 336/90; 336/92
(58) Field of Search .............................. 336/90, 96, 92

(56) References Cited

U.S. PATENT DOCUMENTS 4,263,479 A * 4/1981 Lange et al. .................... 178/46
5,423,117 A * 6/1995 Okada et al. .................... 29/605

* cited by examiner

*Primary Examiner*—Anh Mai
(74) *Attorney, Agent, or Firm*—Young & Thompson

(57) ABSTRACT

In a magnetic core for a non-contact displacement sensor comprising a detecting coil, a coil receiving member and a terminal, the coil receiving member is comprised of a green compact made of insulated soft magnetic powder and an insulating layer covering the green compact, and an organic resin is filled in a closed space of the coil receiving member.

4 Claims, 6 Drawing Sheets

MAGNETIC CORE FOR A NON-CONTACT DISPLACEMENT SENSOR

BACKGROUND OF THE INVENTION

1. Field of the Invention

This invention relates to a magnetic core for a non-contact displacement sensor, and more concretely to a magnetic core for a non-contact torque sensor using a green compact made of an insulated soft magnetic powder being cheap and having a relatively high specific resistance value or so-called powder magnetic core as a skeleton of a coil receiving member constituting the magnetic core and effectively improving mechanical characteristics, which have caused trouble in the use of the green compact, and particularly useful for an electrically operated power steering apparatus for an automobile.

2. Description of Related Art

The power steering apparatus is an apparatus for assisting a steering effort of the automobile. Although a hydraulic power steering apparatus was mainstream in the past, so-called electrically operated power steering apparatus assisting the steering effort by an electric motor is recently and widely developed.

The electrically operated power steering apparatus has various advantages that a controllability is excellent as compared with that of the hydraulic power steering apparatus, and mechanical portions are simple, and a fuel consumption is good, and power is supplied to the electric motor only in case of necessity and the like.

In the system of the electrically operated power steering apparatus, a direction and a quantity of power when operating a handle (a steering wheel) are detected by a torque sensor and a current of the electric motor assisting the steering effort is controlled by a control unit in accordance with the detected value.

In FIG. 7 is shown a main part of a representative non-contact torque sensor constituting the electrically operated power steering apparatus.

The torque sensor 101 is mainly comprised of an input shaft 102 connected to a handle (not shown), an output shaft 103 connected to a side of the steering wheel, a torsion bar 104 connecting the shaft 102 to the shaft 103, first and second detecting rings 105 and 106 arranged on an outer peripheral side of the torsion bar 104 at sides of the input shaft 102 and the output shaft 103 and opposite to each other, and a magnetic core 108 comprising a detecting coil 107 for detecting a relative displacement of the first detecting ring 105 displaced in accordance with a displacement of the torsion bar 104 when a torque is applied to the input shaft 102 with respect to the second detecting ring 106 as a change of an inductance at a non-contact state.

And also, the magnetic core 108 is mainly comprised of the detecting coil 107 wound around a coil bobbin, a toroidal coil receiving member 109 having a space for receiving the detecting coil 107 therein, forming a closed space S together with the detecting coil 107 received therein and retaining the detecting coil 107 in a position separated away at a constant distance from outer circumferential surfaces of the detecting rings 105 and 106, and lead wires 110 connected at their one ends to the detecting coil 107 and led out at the other ends outward from the coil receiving member 109.

In the conventional magnetic core 108, as shown in FIG. 8, the coil receiving member 109 comprises a coil receiving case 111 receiving the detecting coil 107 and a cap 112 press fitted into an opening of the case 111. Each of the coil receiving case 111 and the cap 112 is made of a soft magnetic sintered body formed by compression shaping powder of an electromagnetic stainless steel system or an iron-based soft magnetic material into a green compact and further sintering the green compact. And also, the detecting coil 107 is generally fixed to the inner surface of the coil receiving member 109 with an adhesive 113.

However, since the soft magnetic sintered body is low in the specific resistance value as compared with ferrite, sendust alloy or the like and bad in the detecting sensitivity, if a frequency of a driving power is set to a high value for improving the detecting sensitivity, an eddy current loss becomes large and an inductance lowers, and hence the detecting sensitivity is rather degraded and it is difficult to conduct the detection in a higher accuracy.

On the other hand, as the ferrite and sendust alloy have excellent magnetic properties, they enable the detection in a higher accuracy, but are expensive, so that the application of them to the coil receiving member is unfavorable from a viewpoint of the cost. In addition, the ferrite has a drawback that the temperature change of the inductance is large.

Moreover, the coil receiving member having a relatively high specific resistance value and being cheap is known to be constructed with a green compact made of insulated soft magnetic powder.

The coil receiving member constituted with such a green compact is known to have a good detecting sensitivity because the eddy current loss is small in case of applying a high frequency current. Since the green compact is not subjected to a sintering, however, the coil receiving member is weak in the strength and has particularly a fear of easily breaking when a shock is applied thereto, so that the manufacture is difficult in the conventional press-fitting structure. Furthermore, the applications are critical, and it is said that the application to the electrically operated power steering is difficult in the existing technique.

In the conventional magnetic core (FIG. 8), the detecting coil 107, more concretely, the coil bobbin 114 wound with the detecting coil is merely fixed to the inner surface of the coil receiving member 109 through the adhesive, so that there is assumed a case that the fixing of the coil bobbin 114 to the inner surface of the coil receiving member 109 becomes insufficient. In this case, it is assumed that a strong impact force is applied to the coil receiving member 109 by the coil bobbin 114 to thereby break the coil receiving member 109.

Moreover, nothing is filled in the closed space S formed after the detecting coil 107 is received in the coil receiving member 109, so that there is a possibility of disturbing the wound state of the detecting coil 107, which is in danger of giving a largely bad influence upon the magnetic properties.

Therefore, when the coil receiving member is made of the above green compact, it is required to surely fix the detecting coil 107 to the coil receiving member 109 and to take means for maintaining the wound state of the detecting coil.

And also, a usual displacement sensor is arranged in a housing made of an aluminum alloy or the like in internally contact therewith in order to avoid an influence by an electromagnetic wave from exterior. However, when the coil receiving member not provided on its outer surface with an insulating coating internally contacts with the housing, the eddy current generates in the housing and there is caused a problem of lowering the sensitivity of the detecting coil. In addition, when the housing is made of the aluminum alloy, it is apt to easily cause a phenomenon of biting onto the coil receiving member by a difference of thermal expansion coefficient between the housing and the coil receiving member, especially by a large thermal shrinkage of the housing at a low temperature, and there may be a case that the magnetic core is distorted by such a phenomenon to cause a deviation in the inductance.

SUMMARY OF THE INVENTION

It is, therefore, an object of the invention to provide a magnetic core for a non-contact torque sensor using a green compact made of an insulated soft magnetic powder being cheap and having a relatively high specific resistance value as a skeleton of a coil receiving member constituting the magnetic core and effectively improving mechanical characteristics, which have caused trouble in the use of the green compact, and particularly useful for an electrically operated power steering apparatus for an automobile.

According to the invention, there is the provision of in a magnetic core for a non-contact displacement sensor comprising a detecting coil for detecting a relative displacement of a first detecting ring with respect to a second detecting ring as a change of inductance at a non-contact state when the first and second detecting rings are arranged opposite to each other on an outer peripheral side of a torsion bar coaxially connecting an input shaft to an output shaft at sides of the input shaft and output shaft, respectively, and the first detecting ring is displaced in accordance with a displacement of the torsion bar by applying a torque to the input shaft, a toroidal coil receiving member having a space for receiving the detecting coil therein, forming a closed space together with the detecting coil received therein and retaining the detecting coil in a position separated away at a constant distance from outer circumferential surfaces of the detecting rings, and lead wires connected at their one ends to the detecting coil and led out at the other ends outward from the coil receiving member, an improvement wherein the coil receiving member comprises a green compact obtained by compression molding insulated soft magnetic powders into a given shape and an insulating layer covering an outer surface of the green compact, and an organic resin is filled in the closed space of the coil receiving member received with the detecting coil to surely fix the detecting coil in the coil receiving member.

In a preferable embodiment of the invention, the coil receiving member is provided with at least one through-hole for filling the organic resin in the closed space and/or the coil receiving member comprises a coil housing case having upper and lower openings at both ends thereof and capable of housing the detecting coil from the upper opening and laying the detecting coil on the lower opening, and a cap attached to the upper opening of the coil housing case after the housing of the detecting coil to form the closed space.

In addition, a material constituting the insulating layer and the organic resin filled in the closed space are more preferable to be a thermoplastic resin or a thermosetting resin.

BRIEF DESCRIPTION OF THE DRAWINGS

The invention will be described with reference to the accompanying drawings, wherein.

DETAILED DESCRIPTION OF THE INVENTION

Figure 1A:
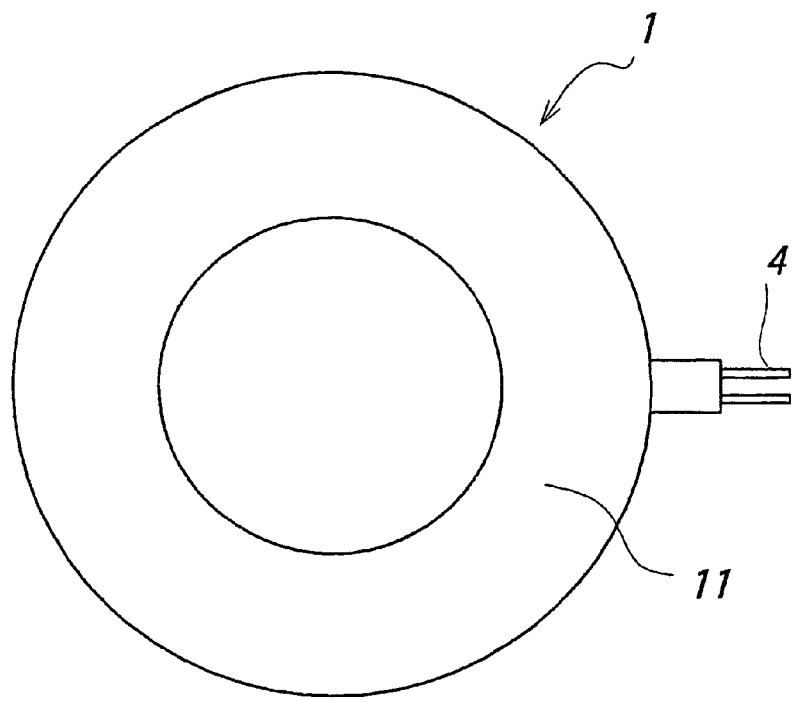
FIG. 1A is a diagrammatically plan view of a first embodiment of the magnetic core for non-contact displacement sensor according to the invention.
Figure 1B:
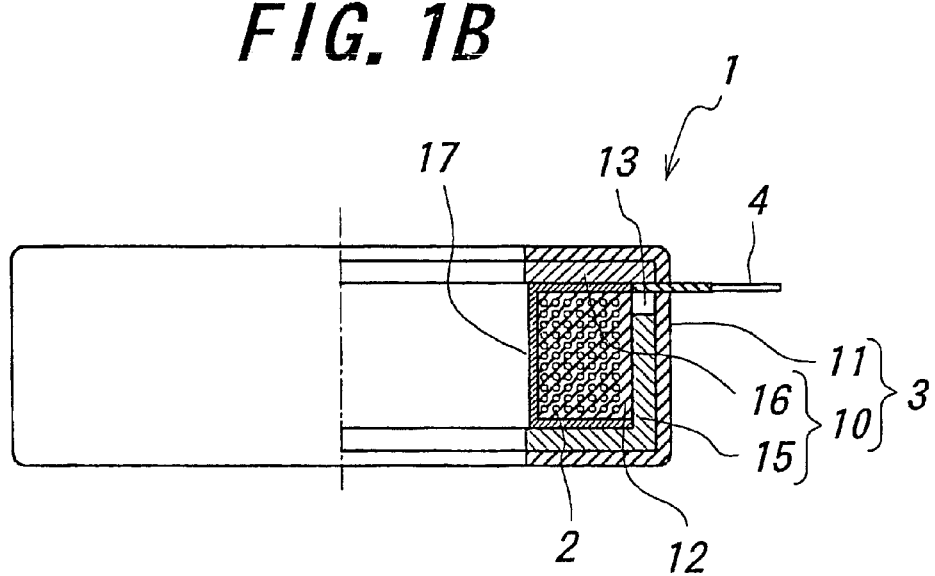
FIG. 1B is a side view partially shown in section of the first embodiment according to the invention.

A representative magnetic core for non-contact displacement sensor according to the invention is shown in FIGS. 1A and 1B, in which FIG. 1A is a plan view and FIG. 1B is a side view partly shown in section.

Figure 2:
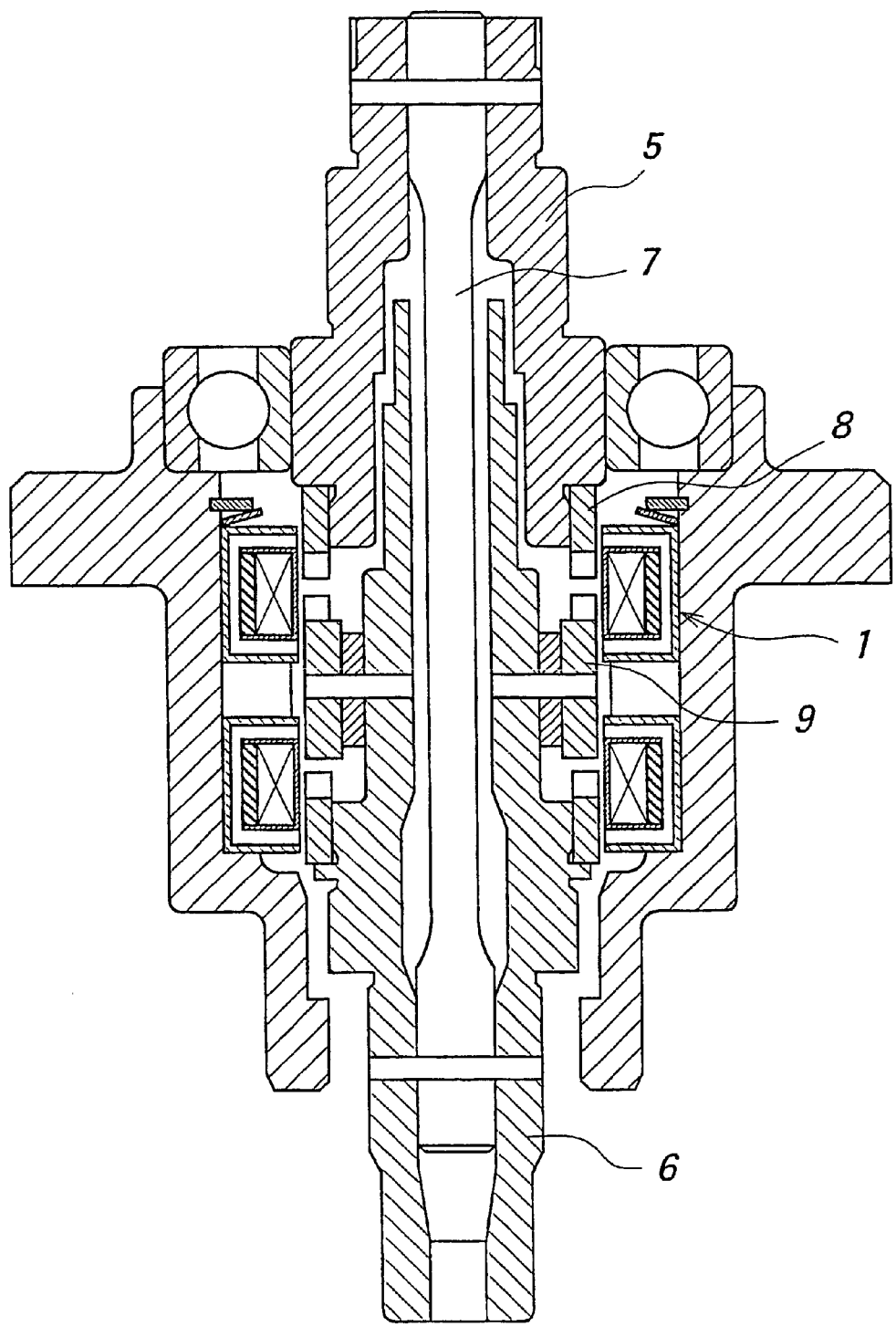
FIG. 2 is a diagrammatically section view of an electrically operated power steering apparatus provided with the magnetic core shown in FIG. 1.

In FIG. 2 is shown an embodiment of an electrically operated power steering apparatus for an automobile provided with the magnetic core shown in FIGS. 1A and 1B.

The magnetic core 1 shown in FIG. 1 is mainly comprised of a detecting coil 2 wound around a coil bobbin 17, a coil receiving member 3 housing the detecting coil 2 therein and a terminal 4 (including lead wires) extending from the detecting coil 2 toward an outside of the coil receiving member 3.

As shown in FIG. 2, the detecting coil 2 is a member for detecting a relative displacement of a first detecting ring 8 with respect to a second detecting ring 9 as a change of inductance at a non-contact state when the first and second detecting rings 8, 9 are arranged opposite to each other on an outer peripheral side of a torsion bar 7 coaxially connecting an input shaft 5 to an output shaft 6 at both sides of the input shaft and output shaft, respectively, and a torque is applied to the input shaft 5 to displace the first detecting ring 8 in accordance with a displacement of the torsion bar 7.

The coil receiving member 3 is a member having a space for housing the detecting coil 2 therein and forming a closed space S together with the received detecting coil 2 and retaining the detecting coil 2 in a position separated apart at a constant distance from outer circumferential surfaces of the detecting rings 8, 9.

The terminal 4 serves to supply a high frequency current from an external power source (not shown) to the detecting coil 2, and is connected to the detecting coil 2 on one hand and to the external power source on the other hand.

Figure 6A:
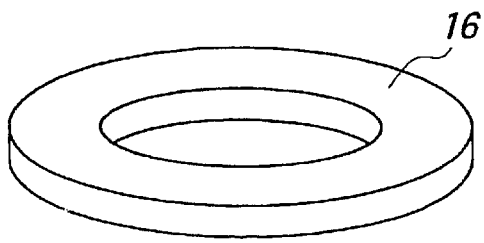
FIGS. 6A to 6C are exploded perspective views of members mainly constituting a fifth embodiment of the magnetic core according to the invention.
Figure 6B:
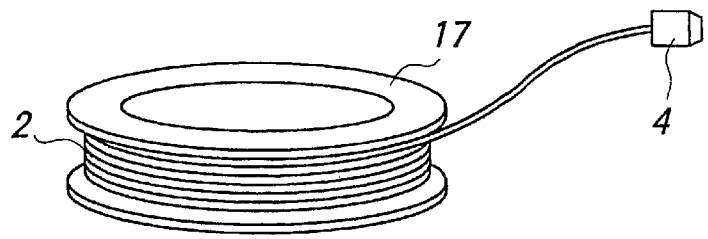
Figure 6C:
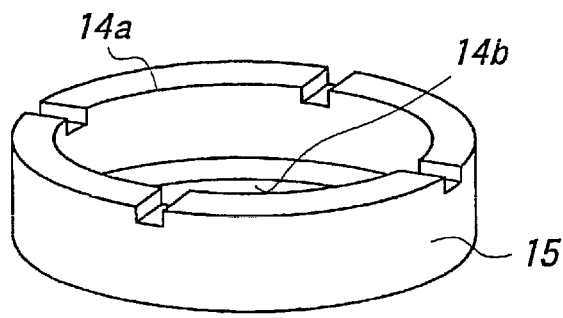
Figure 6D:
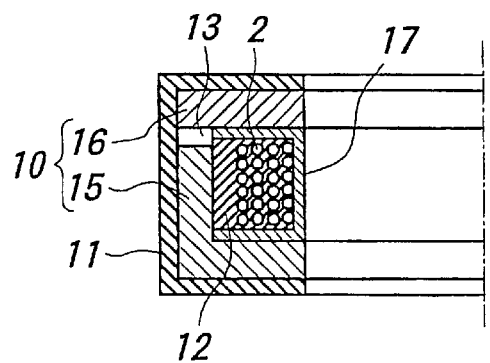
FIG. 6D is a diagrammatically partial section view of the magnetic core manufactured by using these members.
Figure 7:
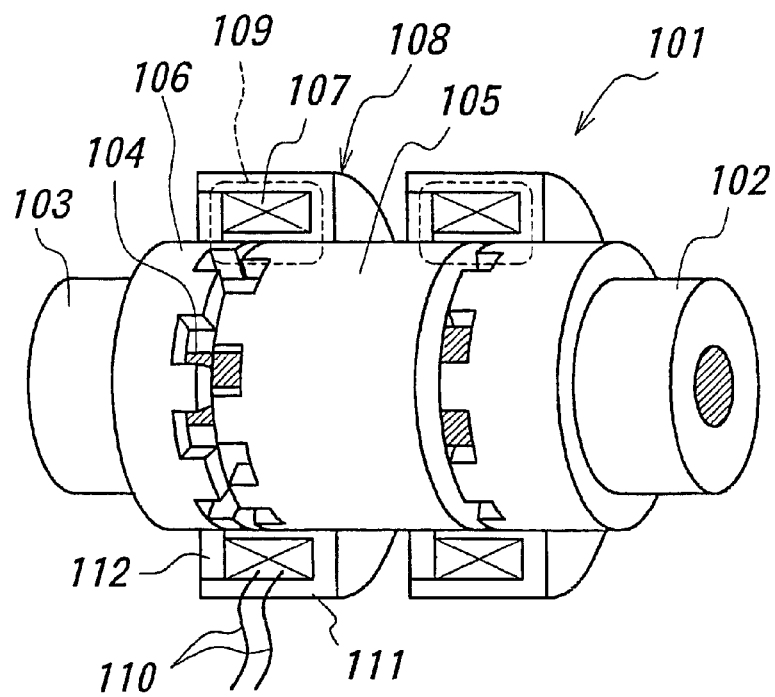
FIG. 7 is a perspective views of a main part of the conventional non-contact torque sensor.
Figure 8:
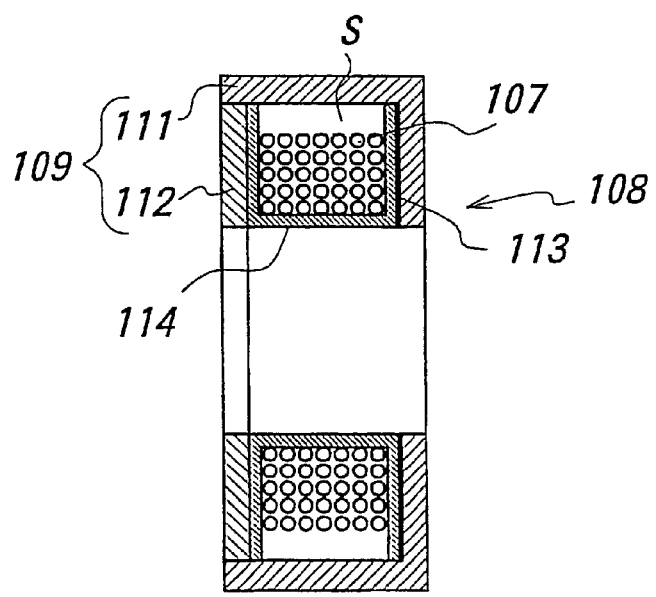
FIG. 8 is a diagrammatically section view of a magnetic core in the conventional non-contact torque sensor.

FIGS. 6A–6C are exploded perspective views for explaining a construction of a representative magnetic core according to the invention, in which FIG. 6A shows a cap 16, FIG. 6B shows a state of winding the detecting coil 2 around the coil bobbin, and FIG. 6C shows a coil housing case 15.

The invention lies in a point that a given green compact 10 having a relative high specific resistance value and being cheap is used as a skeleton of the coil receiving member 3 constituting the magnetic core 1 and an organic resin 12 is filled in a closed space of the coil receiving member 3 received with the detecting coil 2 therein. More concretely, the coil receiving member 3 is constructed with the green compact 10 obtained by compression molding insulated soft magnetic powders into a given shape, and an insulating layer 11 covering an outer surface of the green compact 10, and the organic resin 12 is filled in the closed space of the coil receiving member 3 received with the detecting coil 2 therein to surely fix the detecting coil 2 in the coil receiving member 3.

By adopting the above construction, therefore, even when a high frequency current is applied to the detecting coil 2, the eddy current loss can be decreased to enhance the detecting sensitivity. And also, the strength of the magnetic core as a whole is considerably increased, so that even if shock is particularly applied to the magnetic core, the breakage of the magnetic core hardly occurs. Furthermore, such a magnetic core can be manufactured cheaply. As a result, the magnetic core according to the invention sufficiently possesses the performances as a magnetic core for non-contact displacement sensor, so that it is possible to apply such a magnetic core to, for example, an electrically operated power steering apparatus for automobile.

The green compact 10 is obtained by compression molding the insulated soft magnetic powders into a given shape. As the insulated soft magnetic powder, it is preferable to use a mixed powder obtained by mixing iron powder subjected to, for example, a phosphate treatment or an inorganic coating treatment with not more than 1 mass % of an organic binder. And also, the compression molding is preferable to be conducted under a condition that the density of the green compact becomes not less than 7.2 g/cm$^3$. Moreover, in order to improve the properties of the magnetic core, it is more preferable to heat the green compact to a temperature of not higher than 500° C. after the compression molding.

The insulating layer 11 protects the green compact 10 from the outer surface side thereof, prevents the generation of eddy current when it is arranged in internally contact with the housing, and has an action of mitigating the biting of the housing onto the magnetic core at a lower temperature when the housing is made of an aluminum alloy. And also, as the conduction to the housing is intercepted, the stable response can be obtained without being affected by the change of potential from the vehicle body.

As a material constituting the insulating layer 11 is preferable a thermoplastic resin such as polyphenylene sulfide, polyester, polyamide or the like compounded with glass fibers, or a thermosetting resin such as phenol resin or the like compounded with glass fibers.

The thickness of the insulating layer 11 is preferable to be not less than 0.3 mm. When the thickness is less than 0.3 mm, the green compact can not sufficiently be protected.

Moreover, it is preferable to use an insert molding method as a method for the formation of the insulating layer 11.

As the organic resin 12 filled in the closed space of the coil receiving member 3, a material other than the constituting material of the insulating layer 11 may be used, but it is preferable to use the same material as in the insulating layer. In the latter case, it is favorable to use the insertion molding method capable of simultaneously conducting the formation of the insulating layer 11 and the filling of the organic resin 12 in the closed space.

The coil receiving member 3 is preferable to be provided with at least one through-hole 13 (one through-hole in FIG. 1) in order to fill the organic resin in closed space. Especially, if it is required to rapidly fill the organic resin in the closed space, as shown in FIG. 6C, it is more preferable to arrange a plurality of through-holes 13 on an outer peripheral surface of the coil receiving member at equally divided positions.

As shown in FIG. 6C, the coil receiving member 3 is preferable to be comprised of a coil housing case 15 having upper and lower openings 14a and 14b at both ends and capable of receiving the detecting coil 2 from the upper opening 14a and laying the detecting coil 2 on the lower opening 14b, and a cap 16 forming the closed space S by attaching to the upper opening 14a of the coil housing case 15 received with the detecting coil 2 therein. In this case, the through-hole 13 may be formed in at least one of the coil housing case 15 and the cap 16.

Figure 3:
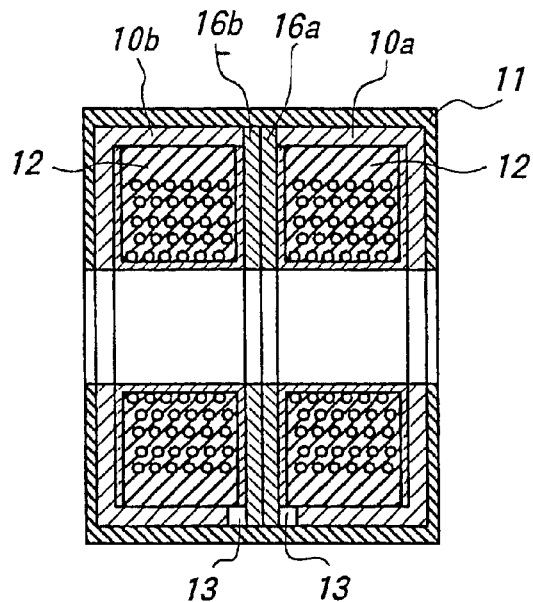
FIG. 3 is a section view of a second embodiment of the magnetic core according to the invention.

In another embodiment of the invention, as shown in FIG. 3, after two green compacts 10a and 10b received with the detecting coil 2 therein are set so as to overlap two caps 16a and 16b with each other, by using the insert molding method is filled the organic resin 12 in the closed spaces of the green compacts 10a, 10b while covering the whole of the outer surfaces of the green compacts with the insulating layer 11. Thus, the productivity can be improved.

Figure 4:
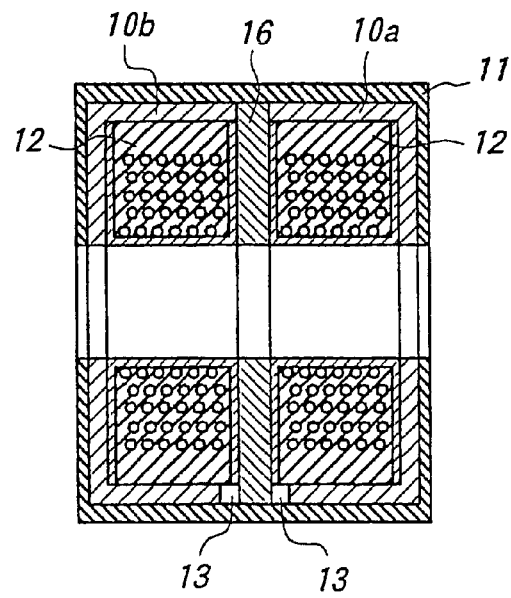
FIG. 4 is a section view of a third embodiment of the magnetic core according to the invention.

As shown in FIG. 4, the upper openings of the two green compacts 10a, 10b can be closed by a common cap 16, whereby the production cost of the magnetic core can be reduced and the productivity can be more improved.

Figure 5:
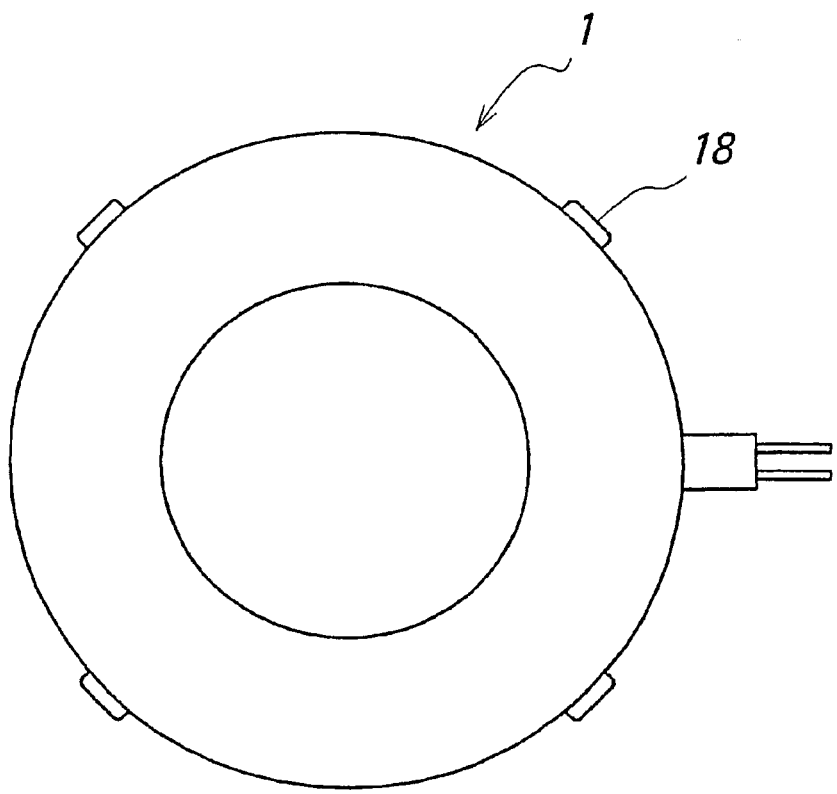
FIG. 5 is a diagrammatically plan view of a fourth embodiment of the magnetic core according to the invention.

Although the above is described with respect to only an embodiment of the invention, various modifications may be taken within a scope of the invention. For example, as shown in FIG. 5, three or more protruding portions 18 (four protruding portions in the illustrated embodiment) are arranged on the outer peripheral surface of the magnetic core for the displacement sensor, whereby the magnetic core can strongly be fixed to the inner circumferential surface of the housing.

As mentioned above, according to the invention, the green compact made of the insulated soft magnetic powder is used as a skeleton of the coil receiving member, whereby the eddy current loss in the application of high frequency current is decreased and a high inductance characteristic is obtained, and hence the detecting sensitivity can effectively be improved.

By filling the organic resin in the closed space of the coil receiving member received with the detecting coil therein can surely be fixed the detecting coil to the coil receiving member and the strength as a magnetic core can considerably be increased.

Moreover, the eddy current loss liable to be caused when the magnetic core is internally contacted with the housing can be controlled by covering the outer surface of the green compact with the insulating layer. In addition, when the housing is made of an aluminum alloy, the biting of the housing onto the magnetic core liable to be caused at a low temperature is mitigated by the insulating layer, so that the magnetic core is hardly distorted and the stable inductance characteristic can be obtained.

What is claimed is:

1. A magnetic core for a non-contact displacement sensor comprising a detecting coil for detecting a relative displacement of a first detecting ring with respect to a second detecting ring as a change of inductance at a non-contact state when the first and second detecting rings are arranged opposite to each other on an outer peripheral side of a torsion bar coaxially connecting an input shaft to an output shaft at sides of the input shaft and output shaft, respectively, and the first detecting ring is displaced in accordance with a displacement of the torsion bar by applying a torque to the input shaft, a toroidal coil receiving member having a space for receiving the detecting coil therein, forming a closed space together with the detecting coil received therein and retaining the detecting coil in a position separated away at a constant distance from outer circumferential surfaces of the detecting rings, and lead wires connected at their one ends to the detecting coil and led out at the other ends outward from the coil receiving member, an improvement wherein the coil receiving member comprises a green compact obtained by compression molding insulated soft magnetic powders into a given shape and an insulating layer covering an outer surface of the green compact, and an organic resin is filled in the closed space of the coil receiving member received with the detecting coil to surely fix the detecting coil in the coil receiving member.

2. A magnetic core according to claim 1, wherein the coil receiving member is provided with at least one through-hole for filling the organic resin in the closed space.

3. A magnetic core according to claim 1, wherein the coil receiving member comprises a coil housing case having upper and lower openings at both ends thereof and capable of housing the detecting coil from the upper opening and laying the detecting coil on the lower opening, and a cap attached to the upper opening of the coil housing case after the housing of the detecting coil to form the closed space.

4. A magnetic core according to claim 1, wherein a material constituting the insulating layer and the organic resin filled in the closed space are a thermoplastic resin or a thermosetting resin.

* * * * *